United States Patent
Desai et al.

(10) Patent No.: US 9,325,501 B2
(45) Date of Patent: Apr. 26, 2016

(54) METHOD TO IMPLEMENT TWO FIBER SHARED PROTECTION RING WITH EXTRA TRAFFIC ON STM-1/OC-3 INTERFACE

(75) Inventors: Hiren Desai, Bangalore (IN); Nishant Sharma, Bangalore (IN); Nikhil Satyarthi, Bangalore (IN); Karthik Muthuraja, Bangalore (IN)

(73) Assignee: TEJAS NETWORKS LTD., Bangalore (IN)

( * ) Notice: Subject to any disclaimer, the term of this patent is extended or adjusted under 35 U.S.C. 154(b) by 547 days.

(21) Appl. No.: 13/033,530

(22) Filed: Feb. 23, 2011

(65) Prior Publication Data
US 2012/0087236 A1  Apr. 12, 2012

(30) Foreign Application Priority Data
Oct. 11, 2010 (IN) .......................... 3011/CHE/2010

(51) Int. Cl.
*H04L 12/437* (2006.01)
*H04L 9/32* (2006.01)

(52) U.S. Cl.
CPC ...................................... *H04L 9/32* (2013.01)

(58) Field of Classification Search
USPC ............ 370/395.51, 907, 216–228, 246–252, 370/404–406, 424
See application file for complete search history.

(56) References Cited

U.S. PATENT DOCUMENTS

| | | | |
|---|---|---|---|
| 7,353,288 B1* | 4/2008 | Rangavajjhala et al. | 709/236 |
| 7,573,814 B1* | 8/2009 | Luft et al. | 370/223 |
| 2002/0080445 A1* | 6/2002 | Falkenstein et al. | 359/127 |
| 2004/0095955 A1* | 5/2004 | Subramanian et al. | 370/458 |
| 2004/0213282 A1* | 10/2004 | Kirk et al. | 370/458 |
| 2006/0064479 A1* | 3/2006 | Meged et al. | 709/224 |

* cited by examiner

*Primary Examiner* — Abdullah Riyami
*Assistant Examiner* — Brian Cox
(74) *Attorney, Agent, or Firm* — Oliff PLC (57) ABSTRACT

A method for protection of data traffic transmitted over 2-fiber shared protection ring on STM-1/OC-3 interface is provided. Also, the method involves carrying extra traffic in a ring topology for STM-1/OC-3 interface. This is achieved by fixing the granularity to one of 'VC12/VC11/VC3/VC12-VC3/VC11-VC3' for the STM-1 interface and to one of 'VT2/VT1.5/STS-1' for the OC-3 interface upfront when the protection is configured on the network element.

18 Claims, 7 Drawing Sheets

METHOD TO IMPLEMENT TWO FIBER SHARED PROTECTION RING WITH EXTRA TRAFFIC ON STM-1/OC-3 INTERFACE

CROSS-REFERENCE TO RELATED APPLICATIONS

This application claims priority to Indian Patent Application No. 3011/CHE/2010 filed Oct. 11, 2010, the entire content of which is hereby expressly incorporated by reference.

FIELD OF INVENTION

The present disclosure relates to an implementation of 2-fiber shared protection ring in SDH/SONET networks

BACKGROUND OF THE INVENTION

The classification of shared/dedicated protection is done based on the definition of shared protection as per ITU-T G.803/G.8411.e. "A protection architecture using m protection entities shared among n working entities (m:n). The protection entities may also be used to carry extra traffic when not used for protection"

The 'n' working entities can be either part of the same network element in a form of a link or an STM path entity which are the cases of 1:N MSP and 1:N SNCP respectively or part of different network elements in the case of MSSPRing (Multiplex Section Shared Protection Ring).

A shared protection ring comprises of N network elements or nodes forming a ring via interconnected fibers in which each of them have some reserved work capacity and some reserved protect capacity i.e. in state of the art 2-fiber systems, for a total capacity of X, X/2 is each reserved for work and protect, wherein the reserved protect capacity is used to carry the work traffic of any of the N nodes against any failure anywhere in the ring. In case the protect capacity is not required to protect any of the work traffic in the ring, it carries a lower priority extra traffic.

The term "shared" implies that for a work traffic there is no dedicated protect which is always available. In simple terms the protect capacity is shared and might be used by any of the network elements forming the protection ring when required (based on where the failure has happened in the ring).

Depending on which of the spans in the ring a failure(s) has happened, the protected work traffic which gets carried on the network element's protect capacity can be one of its own work traffic or the traffic of one of the N network elements whose work traffic is affected due to the failure.

Figure 1:
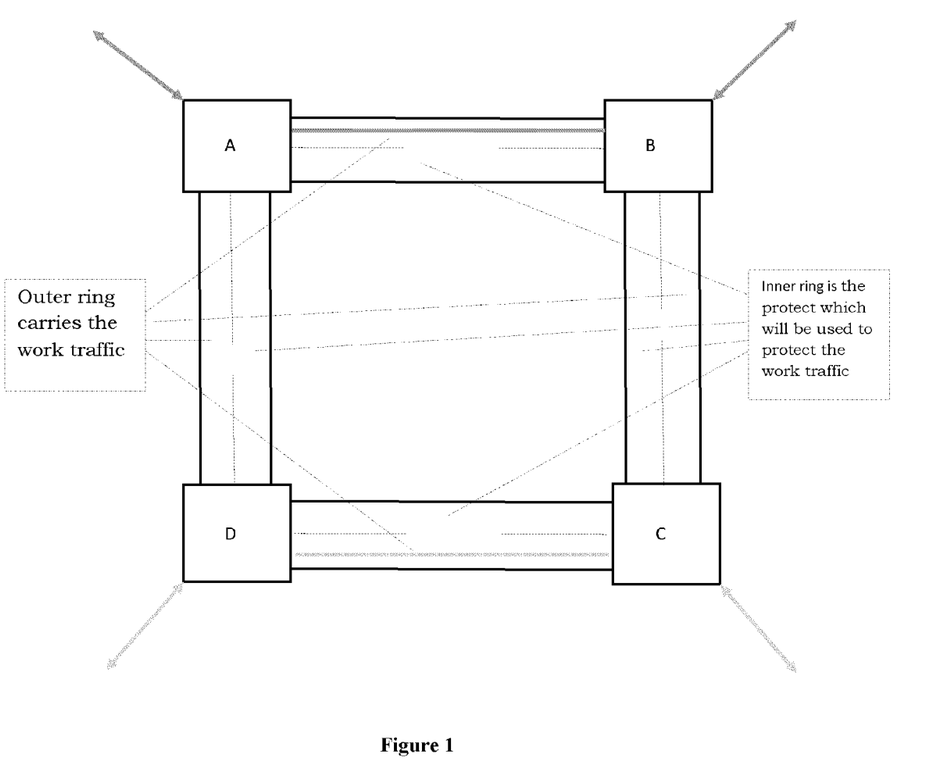
FIG. 1 shows 2-fiber ring network architecture with shared protection.

FIG. 1 shows a 2-fiber architecture which explains the concept of shared protection as an example. In FIG. 1, 4 nodes (A, B, C, D) are shown to be part of a 2 fiber MSSPRing ring. Two work circuits have been shown: one from A-B and the other C-D.

Figure 2:
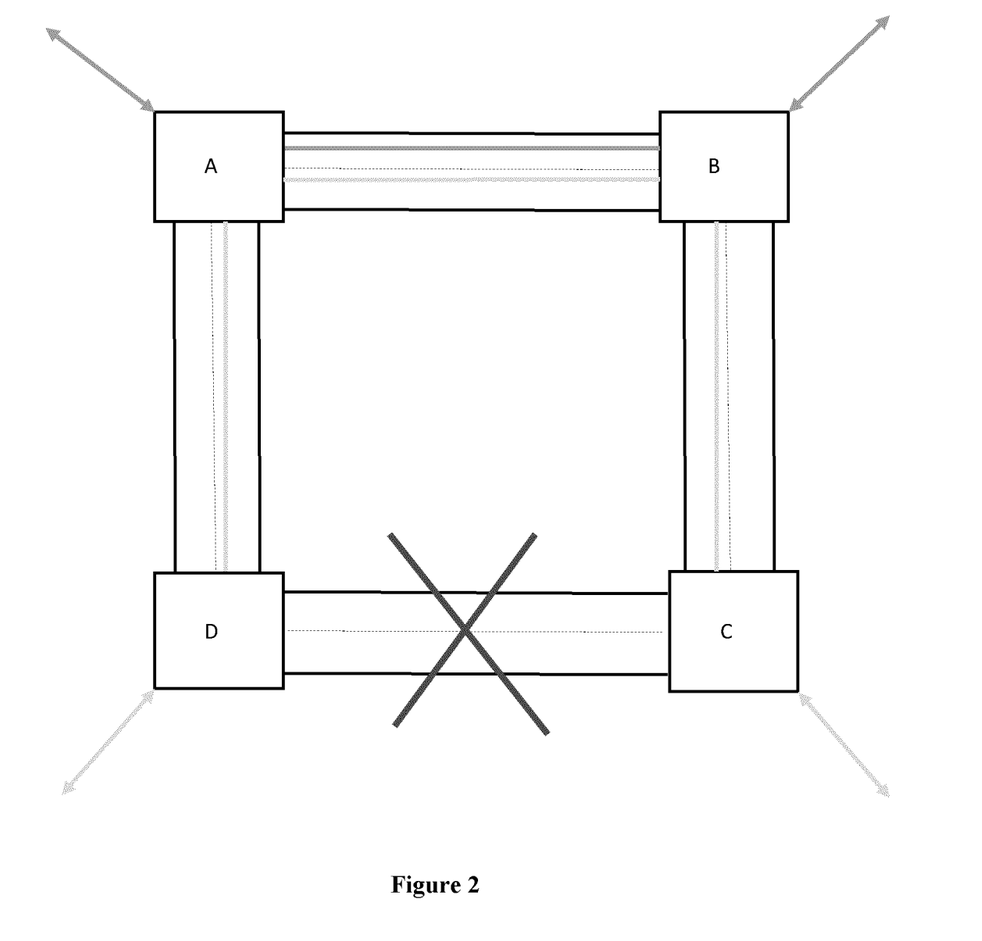
FIG. 2 shows an example of 2-fiber ring network architecture with shared protection with a failed link C-D.

FIG. 2 shows that a failure between the link C-D leads to protection of the circuit going through C-D span being carried via the long path D-A-B-C. Hence, the reserved protect bandwidth of D-A, A-B and B-C links are used to carry the protected work traffic across links C-D.

Figure 3:
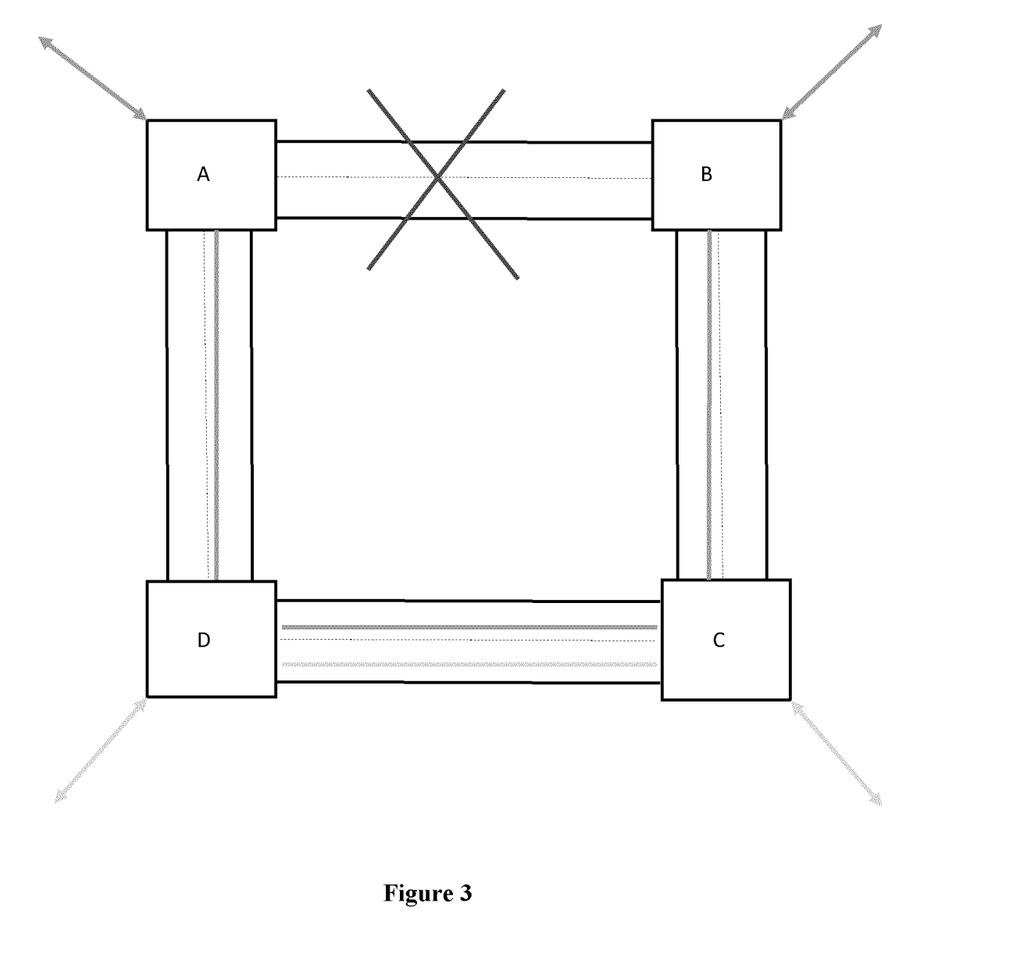
FIG. 3 shows another example of 2-fiber ring network architecture with shared protection with a failed link A-B.

FIG. 3 shows that a failure between the link A-B leads to protection of the circuit going through A-B span being carried via the long path A-D-C-B. Hence, the reserved protect bandwidth of D-A, D-C and B-C links are used to carry the protected work traffic across links A-B.

As shown in FIGS. 2 and 3, in both the scenarios, the links A-D and B-C are used to carry different protected work traffics, in one case that of C-D and in the other case that of A-B. Hence, the location of failure decides what work traffic is carried on the reserved protect bandwidth. Since, the reserved protect bandwidth is used for protection of the work traffic for the whole ring, hence the term shared is being used.

As shown in FIGS. 2 and 3 as examples, the work and the protect division is done in the same link/fiber. For a signal rate of X, X/2 each is reserved for each of the work and protect. This is the case of 2-fiber MSSPRing/BLSR.

Figure 4:
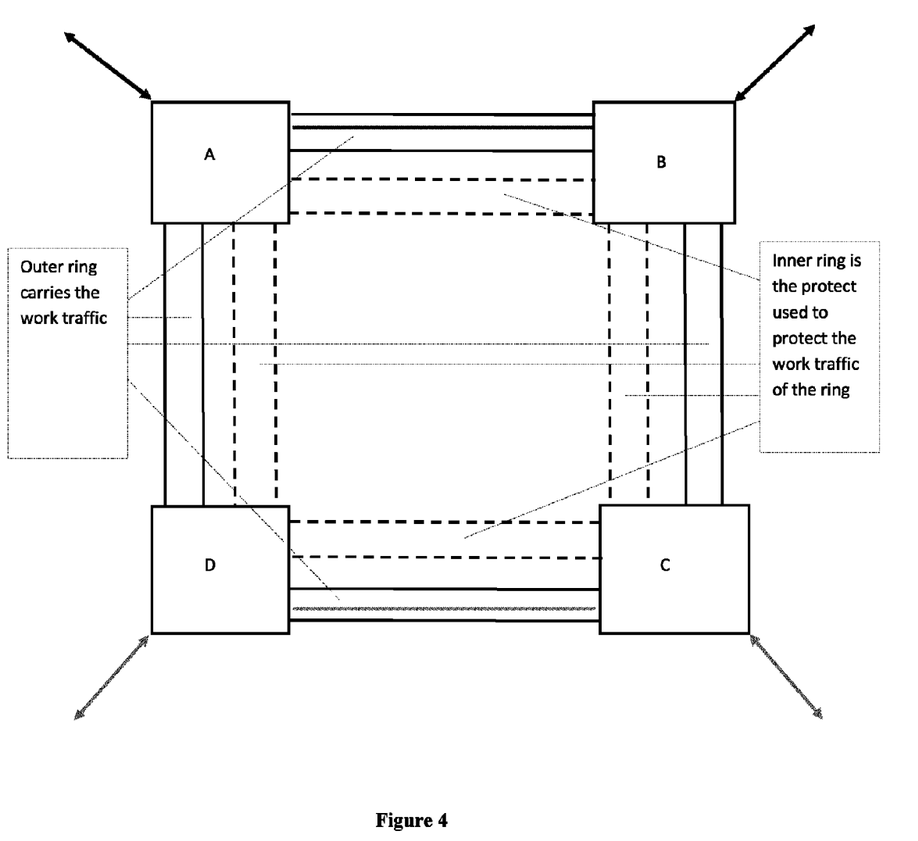
FIG. 4 shows 4-fiber ring network architecture with shared protection.
Figure 5:
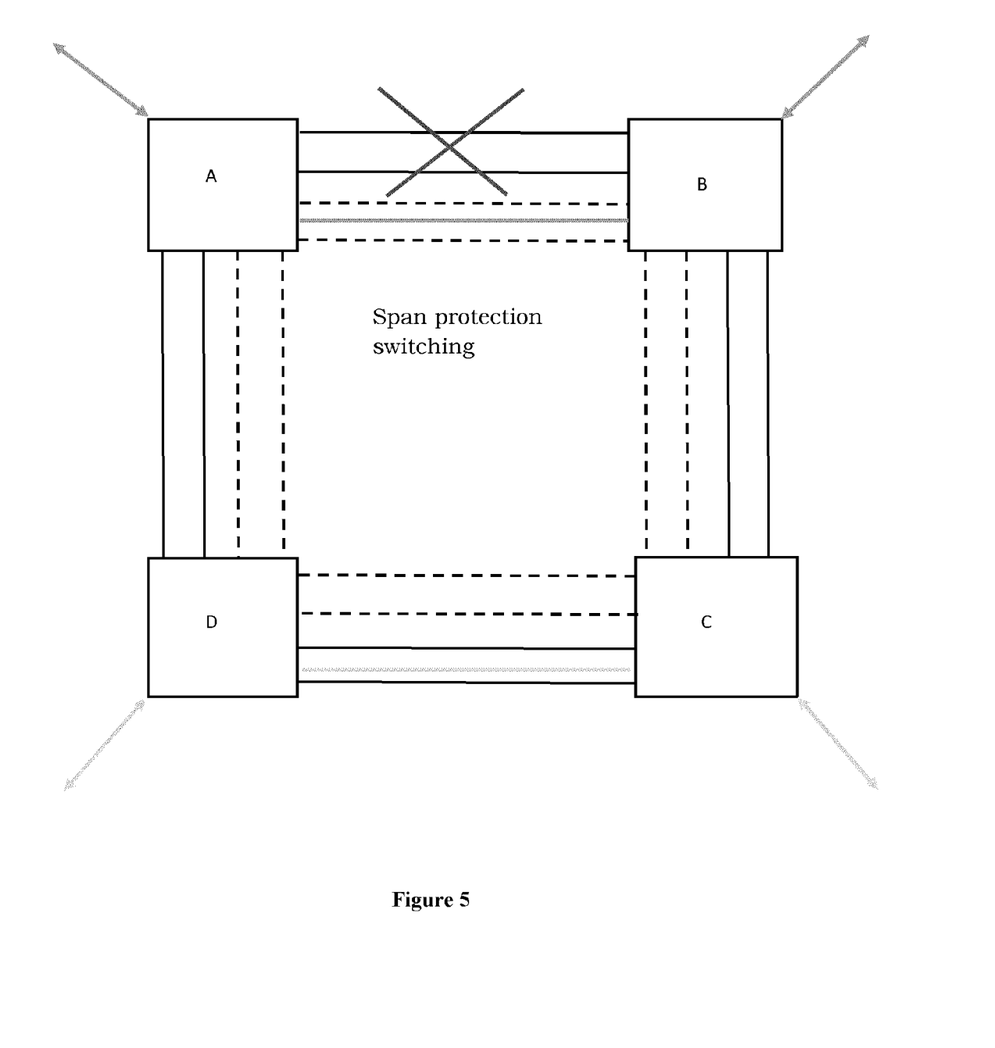
FIG. 5 shows an example of 4-fiber ring network architecture with span protection with a failed work link between A-B.
Figure 6:
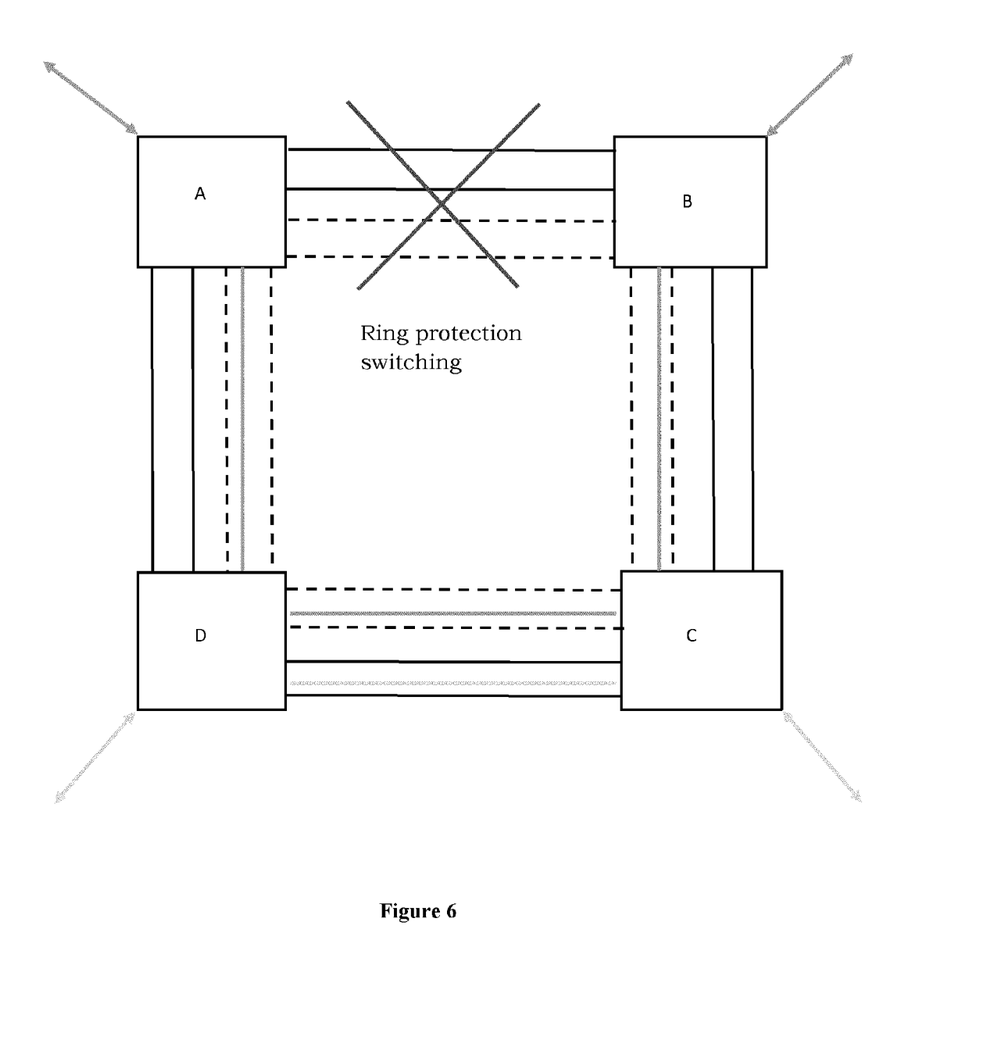
FIG. 6 shows an example of 4-fiber ring network architecture with ring protection with both the work and protect spans failed between A-B.
Figure 7:
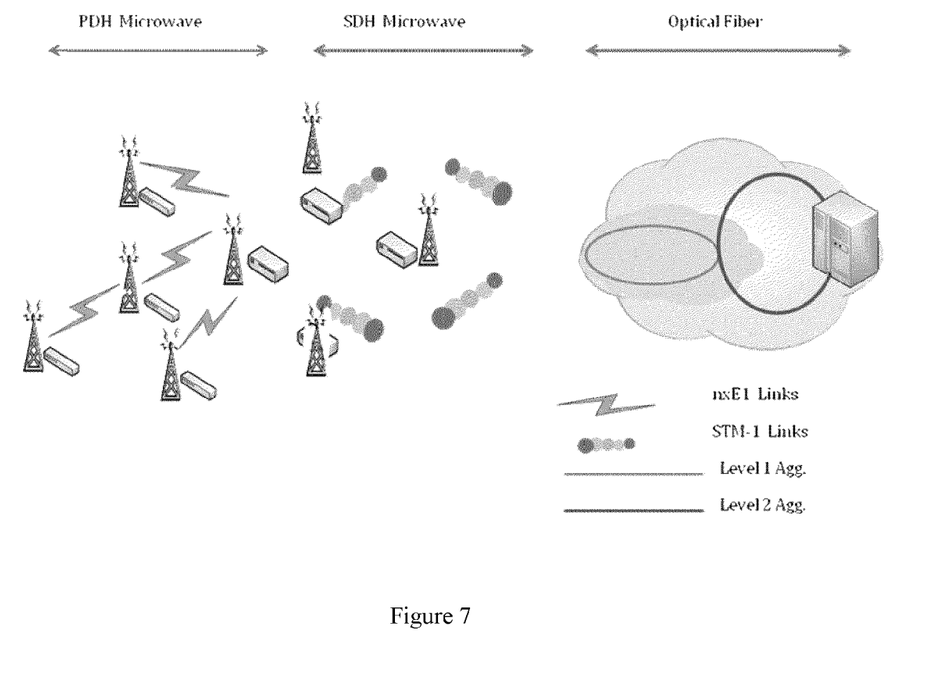
FIG. 7 shows a SDH network of STM-1 microwave links acting as a wireless backhaul.

In case the protect is all together carried on a different fiber, the protection mechanism becomes a 4 fiber MSSPRing/BLSR. Here, two fibers are designated to contain work traffic and the other two to carry the protect traffic. FIG. 4 illustrates the same. 4 fiber MSSPRing/BLSR has an additional span protection in addition to the ring protection provided by 2 fiber MSSPRing/BLSR as illustrated by FIGS. 5 and 6.

In SDH/SONET networks the most common and fully standardized protection schemes (recommended as per ITU-T G.841, Bellcore GR1230, Bellcore GR 1400) are:
 1+1 SNCP/UPSR
 1+1 MSP/APS
 1:N MSP/APS
 For STM4/OC12 and above rates 2-Fiber MSSPRing/BLSR
 For STM4/OC12 and above rates 4-Fiber MSSPRing/BLSR 1:1/1:N SNCP schemes which can carry extra traffic are not standardized and are under further study. The reason can be that, running SNCP protocol on individual K-bytes for HO VCs and LO VCs can incur too much overhead and hence would result in high switching times in higher rate STM/OC interfaces where the number of such VCs can be huge in number. Hence, the only widespread used SNCP is the 1+1. Hence, extra traffic can't be carried and shared protection can't be achieved by using 1+1 SNCP/UPSR in a ring topology. 1:N MSP/APS schemes though can carry extra traffic but are for linear topology.

The advantages which MSSPRing/BLSR hence caters to in such cases are:
 Much efficient bandwidth utilization in ring topologies because of the 'shared' concept as compared to 1+1 SNCP/UPSR. Here, the whole ring shares the protect bandwidth.
 Extra traffic can be carried across a ring which is not possible in 1+1 SNCP/UPSR.
 Faster switching times as compared to UPSR/SNCP as the signaling protocol runs at the multiplex section rather than at each virtual container.

The basic premise for the case of 2-Fiber MSSPRing/BLSR is that the number of AU4s/AU3s/STS-1s must be even in number in a STM/OC interface. This in turn means that for an STM-1/OC-3 interface 2-Fiber MSSPRing/BLSR in accordance with the prior art cannot work as the number of switch units in AU4 mapping is '1' and for AU3/STS-1 mapping it is '3'.

Hence, the advantages of 2-fiber MSSPRing/BLSR cannot be harnessed for a STM-1/OC-3 interface i.e. no shared protection ring and no extra traffic in a ring topology.

It must be noted that for 4-fiber MSSPRing/BLSR on STM-1/OC-3 interfaces there is no problem as there is no concept of a division of bandwidth on the same link unlike the 2-fiber case. The protect channels are part of a separate link altogether. But with 4-fiber two explicit links are required to be reserved as protect which requires more number of interfaces in the network element, i.e. more cost is involved.

DETAILED DESCRIPTION

The primary embodiment of the present invention is a method to implement 2-fiber shared protection ring with extra traffic on STM-1/OC-3 interface comprising acts of: utilizing MSSPRing/BLSR method for SDH/SONET traffic protection; configuring the STM-1 interfaces comprising the shared protection ring in AU4/AU3 mapping; configuring the STM-1/OC-3 shared protection ring to operate at predetermined granularities; and protecting the traffic of the STM-1/OC-3 shared protection ring at the predetermined granularities.

In yet another embodiment the STM-1/OC-3 shared protection ring is configured for the predetermined granularity to fix the work and protect channels, switching unit, connection function and squelching procedure for the protection mechanism.

In still another embodiment the predetermined granularities are VC12, VC11, VC3, VC12-VC3 and VC11-VC3 for AU-4 mapping.

In still another embodiment the predetermined granularities are VC12, VC11 and VC3 for AU-3 mapping.

In still another embodiment the VC12 granularity has 1 to 31 TU12 as work channels, 32 to 62 TU12 as protect channels and 63rd TU12 as Enhanced Non pre-emptible Unprotected Traffic (ENUT).

In still another embodiment the VC11 granularity has 1 to 42 TU11 as work channels and 43 to 84 TU11 as protect channels.

In still another embodiment for the AU4 mapping and VC3 granularity 1st TU3 is work channel, 2nd TU3 is protect channel and 3rd TU3 is ENUT channel.

In still another embodiment the VC12-VC3 granularity has 1 to 21 TU12 of first TUG3 as work channels, 22 to 42 TU12 of second TUG3 as protect channels and TU3 of third TUG3 as ENUT channel.

In still another embodiment the VC11-VC3 granularity has 1 to 28 TU11 of first TUG3 as work channels, 29 to 56 TU11 of second TUG3 as protect channels and TU3 of third TUG3 as ENUT channel.

In still another embodiment for the AU3 mapping and VC3 granularity the switching granularity is the higher order AU3 channel.

In still another embodiment for the AU3 mapping and VC3 granularity, 1st AU3 is work channel, 2nd AU3 is protect channel and 3rd AU3 is ENUT channel.

In still another embodiment the switching connection function is implemented at the lower order VC layer for the 2-fiber STM-1 shared protection ring for the group comprising: AU4 mapping and VC12 granularity, AU4 mapping and VC11 granularity, AU4 mapping and VC3 granularity, AU4 mapping and VC12-VC3 granularity, AU4 mapping and VC11-VC3 granularity, AU3 mapping and VC12 granularity and AU3 mapping and VC11 granularity.

In still another embodiment the switching connection function is implemented at the higher order VC layer for the 2-fiber STM-1 shared protection ring for AU3 mapping and VC3 granularity.

In still another embodiment a work or protect channel which is based on the granularity configured for the 2-fiber shared protection ring on STM-1 interface, can be configured as an Enhanced Non pre-emptible Unprotected Traffic (ENUT).

In still another embodiment the ENUT is configured on the TUs based on the STM-1 interface mapping and granularity configured for the system forming 2-fiber shared protection ring, for the following groups: AU4 mapping and VC12 granularity, AU4 mapping and VC11 granularity, AU4 mapping and VC3 granularity, AU4 mapping and VC12-VC3 granularity, AU4 mapping and VC11-VC3 granularity, AU3 mapping and VC12 granularity and AU3 mapping and VC11 granularity.

In still another embodiment the squelching procedure to avoid misconnections in the system forming the 2-fiber shared protection ring on STM-1 interfaces, is performed on the TUs for: AU4 mapping and VC12 granularity; AU4 mapping and VC11 granularity; AU4 mapping and VC3 granularity; AU4 mapping and VC12-VC3 granularity; AU4 mapping and VC11-VC3 granularity; AU3 mapping and VC12 granularity; and AU3 mapping and VC11 granularity.

In still another embodiment the predetermined granularities are VT2, VT1.5 and STS-1 for STS-1 mapping in an OC-3 interface (SONET).

In still another embodiment the VT2 granularity has 1 to 31 VT2s as work channels, 32 to 62 VT2s as protect channels and 63rd VT2 as Enhanced Non pre-emptible Unprotected Traffic (ENUT).

In still another embodiment VT1.5 granularity has 1 to 42 VT1.5s as work channels and 43 to 84 VT1.5s as protect channels.

In still another embodiment the switching connection function is implemented at the lower order layer for the 2-Fiber OC-3 shared protection for the granularities VT2 and VT1.5

In still another embodiment the switching connection function is implemented at the higher order layer for the 2-Fiber OC-3 shared protection for the STS-1 granularity.

In still another embodiment the STS-1 granularity has 1st STS-1 as work channel, 2nd STS-1 as protect channel and 3rd STS-1 as ENUT channel.

In still another embodiment a work or protect channel which is based on the granularity configured for the 2-Fiber shared protection ring on OC-3 interface, can be configured as an Enhanced Non pre-emptible Unprotected Traffic (ENUT).

In still another embodiment the squelching procedure to avoid misconnections in the system forming the 2-Fiber shared protection ring on OC-3 interfaces, is performed on the lower order VTs for the VT2 and VT1.5 granularity.

The basic premise on which the state of the art implementation of 2-fiber MSSPRing/BLSR is based on is that "the number of AU4s/AU3s/STS-1s (Higher Order VCs) in a STM/OC link is always even. The basic switching unit which is chosen for the case of MSSPRing/BLSR is AU/STS-1".

For the sake of example, SDH interface with AU4 mapping has been taken with the basic switch unit of AU4. For the case of SDH, STM interface with AU3 mapping, the basic switch unit is an AU3. Similarly for the case of SONET Optical Carrier (OC) interface, the basic switch unit is an STS-1 (Synchronous Transport Signal-1). The SONET OC interface with STS-1 switching units is exactly similar to SDH interface with AU3 mapping, just a matter of naming. Henceforth, description with respect to SDH interface AU3 mapping will hold good for SONET OC interface also.

As an example say, for a STM link which can have a total number of N AU4s, a 2-Fiber MSSPRing is configured on a network element. In this case AU4 numbers 1 through N/2 at each span are reserved for working channels. AU4 numbers (N/2)+1 through N at each span are reserved for protection channels which can carry extra traffic when the protection switching is not required. So, for a work time-slot X, X+(N/2) is the protect time-slot.

For the case of 4-Fiber MSSPRing, since the protect channels belong to an altogether different link, the AU4 numbers 1 through N at each work span are reserved for working channels. AU4 numbers 1 through N at each protect span are reserved for protection channels.

The table 1 illustrates the work and protect time-slots for the case of 2-Fiber MSSPRing in the case of a STM interface with AU4 mapping.

TABLE 1

| STM interface (AU4 mapping) | Total number of AU4s | Work AU4s | Protect AU4s |
|---|---|---|---|
| STM-4 | 4 | 1-2 | 3-4 |
| STM-16 | 16 | 1-8 | 9-16 |
| STM-64 | 64 | 1-32 | 33-64 |

The table 2 as shown below illustrates the work and protect time-slots for the case of 2-Fiber MSSPRing in the case of a SDH STM interface with AU3 mapping.

TABLE 2

| STM interface (AU3 mapping) | Total number of AU3s | Work AU3s | Protect AU3s |
|---|---|---|---|
| STM-4 | 12 | 1-6 | 7-12 |
| STM-16 | 48 | 1-24 | 25-48 |
| STM-64 | 192 | 1-96 | 97-192 |

The table 3 as shown below illustrates the work and protect time-slots for the case of 2-Fiber BLSR in the case of a SONET interface (OC). Note, this is exactly similar to STM interface with AU3 mapping.

TABLE 3

| OC interface | Total number of STS-1s | Work STS-1s | Protect STS-1s |
|---|---|---|---|
| OC-12 | 12 | 1-6 | 7-12 |
| OC-48 | 48 | 1-24 | 25-48 |
| OC-192 | 192 | 1-96 | 97-192 |

The basic premise for the case of 2Fiber MSSPRing/BLSR is: "the number of AU4s/AU3s/STS-1s must be even in number in a STM/OC interface". This in turn means that for an STM-1/OC-3 interface 2-Fiber MSSPRing/BLSR in accordance with the prior art cannot work as the number of switch units in AU4 mapping is '1' and for AU3/STS-1 mapping it is '3'.

Hence, the advantages of 2-Fiber MSSPRing/BLSR as explained in the previous sections cannot be harnessed for a STM-1/OC-3 interface i.e. no shared protection ring and no extra traffic in a ring topology. In a STM-1/OC-3 ring topology none of the protection schemes as per the prior art can provide shared protection and a mechanism to carry extra traffic.

It must be noted that for 4-Fiber MSSPRing/BLSR on STM-1/OC-3 interfaces there is no problem as there is no concept of a division of bandwidth on the same link unlike the 2-Fiber case. The protect channels are part of a separate link altogether. Hence, implementation of the same can be done with the switch unit being the AU/STS-1 itself. But with 4-Fiber two explicit links are required to be reserved as protect which requires more number of interfaces in the network element, i.e. more cost is involved.

The disclosure solves the problem of not having 2-Fiber shared protection ring and extra traffic on STM-1/OC-3 interfaces.

STM-1 AU4 Mapping Solution

For the case of a SDH interface of STM-1 rate with AU4 mapping the 2-Fiber MSSPRing system installed on the network elements as shown in the FIG. 1 as an example (the maximum number of nodes can be 16), are upfront configured to operate based on one of the following five switching granularities.

VC12 granularity
VC11 granularity
VC3 granularity
VC12-VC3 granularity
VC11-VC3 granularity Based on this ring configuration the kinds of mappings which exist in any of the STM-1 links in the whole ring are fixed to one of the above three types:

1 AU4 containing maximum of 63 TU12s i.e. VC12 granularity
1 AU4 containing maximum of 84 TU11s i.e. VC11 granularity
1 AU4 containing maximum of 3 TU3s i.e. VC3 granularity
1 AU4 containing maximum of 42 TU12s in first two TUG3 and 1 TU3 in $3^{rd}$ TUG3 i.e. VC12-VC3 granularity
1 AU4 containing maximum of 56 TU11s in first two TUG3 and 1 TU3 in $3^{rd}$ TUG3 i.e. VC11-VC3 granularity Fixing the granularity upfront, fixes which of the TUs are work channels and which of them are protected. The basic switching unit is TUs rather than the AU4s.

In the case of VC12 granularity configuration, TU12s 1-31 are designated as working channels and TU12s 32-62 are reserved as protect channels which can carry extra traffic in case the protection switching is not required. The $63^{rd}$ TU12 is permanently designated as an ENUT channel which doesn't participate in the MSSPRing mechanism altogether meaning it can neither be protected nor pre-empted due to MSSPRing protection mechanism. Apart from all this, the working 1-31 TU12s can be configured to be ENUT, and 32-62 protecting TU12s can be configured to be ENUT. No other mapping except AU4-VC12 via a TU12 is allowed on all the STM-1 links in the ring.

In the case of VC11 granularity configuration, TU11s 1-42 are designated as working channels and TU11s 43-84 are reserved as protect channels which can carry extra traffic in case the protection switching is not required. Apart from all this, the working 1-42 TU11s can be configured to be ENUT, and 43-84 protecting TU11s can be configured to be ENUT. No other mapping except AU4-VC11 via a TU11 is allowed on all the STM-1 links in the ring.

In the case of VC3 granularity configuration, 1st TU3 is designated as working channel and $2^{nd}$ TU3 is reserved as protect channel which can carry extra traffic in case the protection switching is not required. The $3^{rd}$ TU3 is permanently designated as an ENUT channel which doesn't participate in the MSSPRing mechanism altogether meaning it can neither be protected nor pre-empted due to MSSPRing protection mechanism. Apart from all this, the working $1^{st}$ TU3 can be configured to be ENUT and protecting 2nd TU3 can be configured to be ENUT. No other mapping except AU4-VC3 via a TU3 is allowed on all the STM-1 links in the ring.

In the case of VC12-VC3 granularity configuration, a total of 42 TU12s in the $1^{st}$ and $2^{nd}$ TUG3 form the work-protect pair, TU12s 1-21 are designated as working channels and TU12s 22-42 are reserved as protect channels which can carry extra traffic in case the protection switching is not required. The TU3 in $3^{rd}$ TUG3 is permanently designated as an ENUT channel which doesn't participate in the MSSPRing mechanism altogether meaning it can neither be protected nor pre-empted due to MSSPRing protection mechanism. Apart from all this, the working 1-21 TU12s can be configured to be ENUT, and 22-42 protecting TU12s can be configured to be ENUT. No other mapping except AU4-VC12 via a TU12 is allowed in the $1^{st}$ and $2^{nd}$ TUG3 and AU4-VC3 via TU3 in the $3^{rd}$ TUG3 of all the STM-1 links forming the protection ring.

In the case of VC11-VC3 granularity configuration, a total of 56 TU11s in the $1^{st}$ and $2^{nd}$ TUG3 form the work-protect pair, TU11s 1-28 are designated as working channels and TU11s 29-56 are reserved as protect channels which can carry extra traffic in case the protection switching is not required. The TU3 in $3^{rd}$ TUG3 is permanently designated as an ENUT channel which doesn't participate in the MSSPRing mechanism altogether meaning it can neither be protected nor pre-empted due to MSSPRing protection mechanism. The working channels 1-28 TU11s can be also configured to be ENUT and protecting channels 29-56 TU11s can be configured to be ENUT. No other mapping except AU4-VC11 via a TU11 is allowed in the $1^{st}$ and $2^{nd}$ TUG3 and AU4-VC3 via TU3 in the $3^{rd}$ TUG3 of all the STM-1 links forming the protection ring.

An ENUT channel is the one which neither gets protected due to MSSPRing protection mechanism nor gets pre-empted due to MSSPRing protection mechanism. The definition of ENUT remains same as per the ENUT of recommendation Bellcore GR1230. ENUT is different and an enhanced version from what is defined for NUT in ITU-T G.841 recommendation.

STM-1 AU3 Mapping Solution

In this case the STM-1 interface has 3 AU3s. One of the following configurations needs to be done for the 2-Fiber MSSPRing system VC12 granularity
VC11 granularity
VC3 granularity In the case of VC12 granularity configuration, TU12s 1-31 are designated as working channels and TU12s 32-62 are reserved as protect channels which can carry extra traffic in case the protection switching is not required. The $63^{rd}$ TU12 is permanently designated as an ENUT channel which doesn't participate in the MSSPRing mechanism altogether meaning it can neither be protected nor pre-empted due to MSSPRing protection mechanism. Apart from all this, the working channels 1-31 TU12s can also be configured to be ENUT, and 32-62 protecting TU12s can be configured to be ENUT. No other mapping except AU3-VC12 via a TU12 is allowed on all the STM-1 links in the ring.

In the case of VC11 granularity configuration, TU11s 1-42 are designated as working channels and TU11s 43-84 are reserved as protect channels which can carry extra traffic in case the protection switching is not required. Apart from all this, the working 1-42 TU11s can be configured to be ENUT, and 43-84 protecting TU11s can be configured to be ENUT. No other mapping except AU3-VC11 via a TU11 is allowed on all the STM-1 links in the ring.

In case of VC3 granularity, the switching granularity is a HO VC AU3. In this case any mapping is allowed inside the AU3 container. The $1^{st}$ AU3 is the work channel and the $2^{nd}$ AU3 is the protect channel which can carry extra traffic when protection switching is not required. The $3^{rd}$ AU3 is permanently designated as ENUT. Apart from this, the $1^{st}$ work and $2^{nd}$ protect AU3 channel can also be configured as ENUT. The VCs inside the AU3s can't be configured as ENUT as such a designation is valid only for the AU3s as these are the real switching granularities. As explained, the AU3s can inside contain VC11/VC12/VC3 mappings, i.e. the STM-1 links in the ring can contain any of the following mappings: AU3-VC11, AU3-VC12, and AU3-VC3. Note, that this is a totally different scheme differing from all the previous mapping and granularity combinations. Here, the granularity is a HO VC and not a LO VC.

The SONET OC3 solution is similar to STM-1 AU3 mapping with just a difference in the names AU3 replaced by STS-1 and TU replaced by VT, etc.

OC-3 STS-1 Mapping Solution

In the case of SONET, the OC-3 interface has 3 STS-1s. One of the following configurations needs to be done for the 2-Fiber BLSR system VT2 granularity
VT1.5 granularity
STS-1 granularity In the case of VT2 granularity configuration, VT2s 1-31 are designated as working channels and VT2s 32-62 are reserved as protect channels which can carry extra traffic in case the protection switching is not required. The $63^{rd}$ VT2 is permanently designated as an ENUT channel which doesn't participate in the BLSR mechanism altogether meaning it can neither be protected nor pre-empted due to BLSR protection mechanism. Apart from all this, the working channels 1-31 VT2s can also be configured to be ENUT, and 32-62 protecting VT2s can be configured to be ENUT. No other mapping except STS-1-VT2SPE via a VT2 is allowed on all the OC-3 links in the ring.

In the case of VT1.5 granularity configuration, VT1.5s 1-42 are designated as working channels and VT1.5s 43-84 are reserved as protect channels which can carry extra traffic in case the protection switching is not required. Apart from all this, the working 1-42 VT1.5s can be configured to be ENUT, and 43-84 protecting VT1.5s can be configured to be ENUT. No other mapping except STS-1-VT1.5SPE via a VT1.5 is allowed on all the OC-3 links in the ring.

In case of STS-1 granularity, the switching granularity is a HO VC STS-1. In this case any mapping is allowed inside the STS-1 container. The $1^{st}$ STS-1 is the work channel and the $2^{nd}$ STS-1 is the protect channel which can carry extra traffic when protection switching is not required. The $3^{rd}$ STS-1 is permanently designated as ENUT. Apart from this, the $1^{st}$ work and $2^{nd}$ protect STS-1 channel can also be configured as ENUT. The VTs inside the STS-1s can't be configured as ENUT as such a designation is valid only for the HO STS-1 as these are the real switching granularities. As explained, the STS-1s can inside contain VT1.5/VT2/STS-1 mappings, i.e. the OC-3 links in the ring can contain any of the following mappings: STS-1-VT2SPE, STS-1-VT1.5SPE, and STS-1-STS-1SPE. Note, that this is a totally different scheme differing from all the previous mapping and granularity combinations. Here, the granularity is a HO channel and not the LO channel.

Work-Protect Table

Table 4 shows the explicit work-protect TU pairs for VC12 granularity in either of the AU4 or AU3 mapping in a STM-1 interface. The ITU-T G.707 compliant k, l, m notation is being used to describe the time-slots of the TUs in the tables. The same table applies for SONET OC-3 STS-1 mapping and VT2 granularity in an OC-3 interface.

TABLE 4

| Work TU12/VT2 (k, l, m) | Corresponding Protect TU12/VT2 (k, l, m) |
|---|---|
| 1 1 1 | 2 4 2 |
| 1 1 2 | 2 4 3 |
| 1 1 3 | 2 5 1 |
| 1 2 1 | 2 5 2 |
| 1 2 2 | 2 5 3 |
| 1 2 3 | 2 6 1 |
| 1 3 1 | 2 6 2 |
| 1 3 2 | 2 6 3 |
| 1 3 3 | 2 7 1 |
| 1 4 1 | 2 7 2 |
| 1 4 2 | 2 7 3 |
| 1 4 3 | 3 1 1 |
| 1 5 1 | 3 1 2 |
| 1 5 2 | 3 1 3 |
| 1 5 3 | 3 2 1 |
| 1 6 1 | 3 2 2 |
| 1 6 2 | 3 2 3 |
| 1 6 3 | 3 3 1 |
| 1 7 1 | 3 3 2 |
| 1 7 2 | 3 3 3 |
| 1 7 3 | 3 4 1 |
| 2 1 1 | 3 4 2 |
| 2 1 2 | 3 4 3 |
| 2 1 3 | 3 5 1 |
| 2 2 1 | 3 5 2 |
| 2 2 2 | 3 5 3 |
| 2 2 3 | 3 6 1 |
| 2 3 1 | 3 6 2 |
| 2 3 2 | 3 6 3 |
| 2 3 3 | 3 7 1 |
| 2 4 1 | 3 7 2 |
|  | 3 7 3 [Fixed To ENUT] |

Table 5 shows the explicit work-protect TU pairs for VC11 granularity in either of the AU4 or AU3 mapping in a STM-1 interface. The same table applies for SONET STS-1 mapping and VT1.5 granularity in an OC-3 interface.

TABLE 5

| Work TU11/VT1.5 (k, l, m) | Corresponding Protect TU11/VT1.5 (k, l, m) |
|---|---|
| 1 1 1 | 2 4 3 |
| 1 1 2 | 2 4 4 |
| 1 1 3 | 2 5 1 |
| 1 1 4 | 2 5 2 |
| 1 2 1 | 2 5 3 |
| 1 2 2 | 2 5 4 |
| 1 2 3 | 2 6 1 |
| 1 2 4 | 2 6 2 |
| 1 3 1 | 2 6 3 |
| 1 3 2 | 2 6 4 |
| 1 3 3 | 2 7 1 |
| 1 3 4 | 2 7 2 |
| 1 4 1 | 2 7 3 |
| 1 4 2 | 2 7 4 |
| 1 4 3 | 3 1 1 |
| 1 4 4 | 3 1 2 |
| 1 5 1 | 3 1 3 |
| 1 5 2 | 3 1 4 |
| 1 5 3 | 3 2 1 |
| 1 5 4 | 3 2 2 |
| 1 6 1 | 3 2 3 |
| 1 6 2 | 3 2 4 |
| 1 6 3 | 3 3 1 |
| 1 6 4 | 3 3 2 |
| 1 7 1 | 3 3 3 |
| 1 7 2 | 3 3 4 |
| 1 7 3 | 3 4 1 |
| 1 7 4 | 3 4 2 |
| 2 1 1 | 3 4 3 |
| 2 1 2 | 3 4 4 |
| 2 1 3 | 3 5 1 |
| 2 1 4 | 3 5 2 |
| 2 2 1 | 3 5 3 |
| 2 2 2 | 3 5 4 |
| 2 2 3 | 3 6 1 |
| 2 2 4 | 3 6 2 |
| 2 3 1 | 3 6 3 |
| 2 3 2 | 3 6 4 |
| 2 3 3 | 3 7 1 |
| 2 3 4 | 3 7 2 |
| 2 4 1 | 3 7 3 |
| 2 4 2 | 3 7 4 |

Table 6 shows the explicit work-protect TU pairs for VC12-VC3 granularity in AU4 mapping in a STM-1 interface.

TABLE 6

| Work TU12 (k, l, m) | Corresponding Protect TU12 (k, l, m) |
|---|---|
| 1 1 1 | 2 1 1 |
| 1 1 2 | 2 1 2 |
| 1 1 3 | 2 1 3 |
| 1 2 1 | 2 2 1 |
| 1 2 2 | 2 2 2 |
| 1 2 3 | 2 2 3 |
| 1 3 1 | 2 3 1 |
| 1 3 2 | 2 3 2 |
| 1 3 3 | 2 3 3 |
| 1 4 1 | 2 4 1 |
| 1 4 2 | 2 4 2 |
| 1 4 3 | 2 4 3 |
| 1 5 1 | 2 5 1 |
| 1 5 2 | 2 5 2 |
| 1 5 3 | 2 5 3 |
| 1 6 1 | 2 6 1 |
| 1 6 2 | 2 6 2 |
| 1 6 3 | 2 6 3 |
| 1 7 1 | 2 7 1 |
| 1 7 2 | 2 7 2 |
| 1 7 3 | 2 7 3 |

TU3 in 3$^{rd}$ TUG3 is fixed as ENUT

Table 7 shows the explicit work-protect TU pairs for VC11-VC3 granularity in AU4 mapping in a STM-1 interface.

TABLE 7

| Work TU11 (k, l, m) | Corresponding Protect TU11 (k, l, m) |
|---|---|
| 1 1 1 | 2 1 1 |
| 1 1 2 | 2 1 2 |
| 1 1 3 | 2 1 3 |
| 1 1 4 | 2 1 4 |
| 1 2 1 | 2 2 1 |
| 1 2 2 | 2 2 2 |
| 1 2 3 | 2 2 3 |
| 1 2 4 | 2 2 4 |
| 1 3 1 | 2 3 1 |
| 1 3 2 | 2 3 2 |
| 1 3 3 | 2 3 3 |
| 1 3 4 | 2 3 4 |
| 1 4 1 | 2 4 1 |
| 1 4 2 | 2 4 2 |
| 1 4 3 | 2 4 3 |
| 1 4 4 | 2 4 4 |
| 1 5 1 | 2 5 1 |
| 1 5 2 | 2 5 2 |

TABLE 7-continued

| Work TU11 (k, l, m) | Corresponding Protect TU11 (k, l, m) |
|---|---|
| 1 5 3 | 2 5 3 |
| 1 5 4 | 2 5 4 |
| 1 6 1 | 2 6 1 |
| 1 6 2 | 2 6 2 |
| 1 6 3 | 2 6 3 |
| 1 6 4 | 2 6 4 |
| 1 7 1 | 2 7 1 |
| 1 7 2 | 2 7 2 |
| 1 7 3 | 2 7 3 |
| 1 7 4 | 2 7 4 |

TU3 in 3$^{rd}$ TUG3 is fixed as ENUT

For the AU4 mapping and VC3 granularity, 1$^{st}$ TU3 is the work channel, 2$^{nd}$ TU3 is the protect channel and the 3$^{rd}$ TU3 is permanently designated as ENUT.

For the AU3 mapping and VC3 granularity, 1$^{st}$ AU3 is the work channel, 2$^{nd}$ AU3 is the protect channel and the 3$^{rd}$ AU3 is permanently designated as ENUT.

For the SONET STS-1 mapping and STS-1 granularity, 1st STS-1 is the work channel, 2nd STS-1 is the protect channel and the 3rd STS-1 is permanently designated as ENUT.

Signaling Protocol

This remains exactly same as per the recommendations in ITU-T G.841/Bellcore GR1230 for the case of 2-Fiber MSSPRing/BLSR, except that the K-bytes are being carried over STM-1/OC-3 link.

Connection Function

The state of the art MSSPRings/BLSRs have their connection functions implemented at HO VC layer. For the implementation as proposed in this document for STM-1/OC-3 2-Fiber MSSPRing/BLSR, for the following cases the connection function is implemented at LO VC layer:

AU4 mapping and VC12 granularity (TU12)
AU4 mapping and VC11 granularity (TU11)
AU4 mapping and VC3 granularity (TU3)
AU4 mapping and VC12-VC3 granularity (TU12)
AU4 mapping and VC11-VC3 granularity (TU11)
AU3 mapping and VC12 granularity (TU12)
AU3 mapping and VC11 granularity (TU11)
SONET STS-1 mapping and VT2 granularity (VT2)
SONET STS-1 mapping and VT1.5 granularity (VT1.5)

For the case of AU3 mapping and VC3 granularity, the connection function is implemented at HO VC layer. For the case of SONET STS-1 mapping and STS-1 granularity, the connection function is also implemented at HO VC layer.

Misconnections and Squelching

For the following cases of:
AU4 mapping and VC12 granularity (TU12)
AU4 mapping and VC11 granularity (TU11)
AU4 mapping and VC3 granularity (TU3)
AU4 mapping and VC12-VC3 granularity (TU12)
AU4 mapping and VC11-VC3 granularity (TU11)
AU3 mapping and VC12 granularity (TU12)
AU3 mapping and VC11 granularity (TU11)
SONET STS-1 mapping and VT2 granularity (VT2)
SONET STS-1 mapping and VT1.5 granularity (VT1.5)

Instead of the HO VCs squelching being done on AU4s and AU3s/STS-1, the squelch table is populated for the individuals work TUs/VTs (LO VCs) as they are the switching units. The method of population is based on first source node ID and last destination node ID of the associated circuit as recommended as per ITU-T G.841/Bellcore GR1230. The squelching is done on the individual TUs/VTs and is never done at the AU4/AU3/STS-1 level. The trigger is just the same as per the recommendations when the first source node or last destination node is isolated and is done on the switching nodes and never on the pass through nodes.

For the case of:
AU3 mapping and VC3 granularity
SONET STS-1 mapping and STS-1 granularity Here, the squelch table is populated on the HO VC i.e. on the work AU3/STS-1 for non-LO VC access nodes. The method of population is based on first source node ID and last destination node ID of the associated circuit as recommended as per Bellcore GR-1230. For LO VC access nodes the squelch table population and mechanism is exactly as described in BellcoreGR1230 (VT-access section).

Extra Traffic

When the protection channels are required for protecting work traffic, the dropped extra traffic is squelched. The squelching methodology is exactly as per the ITU-T G. 841/Bellcore GR1230 recommendations.

The followings are the applications:

As an example, usefulness of this proposed STM-1/OC-3 solution is illustrated as under: Key usage of the technology comes in solving the current limitation of STM-1/OC-3 microwave links. The microwave technology does not allow STM-4/OC-12 or higher rate links with current technology.

STM-1/OC-3 microwave ring is quite common in wireless backhaul (though not limited only to this application). When more bandwidth is required to be backhauled it is not possible to quickly (and sometimes not even possible) lay fiber or put up more microwave link. Typically need for more bandwidth may arise as a result of 3G/4G services getting added in addition to 2G services. Unlike 2G based voice services, 3G/4G services being primarily data services may have couple of characteristics:

1. During failure conditions degraded service (say lower download speed) is possible and mostly acceptable.
2. It may be possible to offer subscribers different service availability SLAs based on price.

As an example,

Case 1—3G Bases station backhauling peak traffic of say 8 Mbps is backhauled through a VCG containing 4 VC12 connections. 2 out of these connections can provisioned be through the working channels (which will be protected on one failure) and other 2 VC12s on extra traffic channels. On a failure, backhaul capacity will come down to 4 Mbps, but it still works with slightly degraded performance. This kind of application technique is usable in case of bundled E1 or DS1s through ML-PPP.

Case 2—If possible it may be possible to backhaul premium subscribers through the protected bandwidth available on the ring. For the subscribers with low availability SLAs can be backhauled through the extra traffic channels available.

The foregoing description is a specific embodiment of the present invention. It should be appreciated that this embodiment is described for purpose of illustration only, and that numerous alterations and modifications may be practiced by those skilled in the art without departing from the spirit and scope of the invention. It is intended that all such modifications and alterations be included insofar as they come within the scope of the invention as claimed or the equivalents thereof.

| Acronyms | Description |
| --- | --- |
| LO VC | Lower Order Virtual Channel |
| HO VC | Higher Order Virtual Channel |
| SDH | Synchronous Digital Hierarchy |
| MSSPRing | Multiplex Section Shared Protection Ring |
| BLSR | Bidirectional Line Switched Ring |
| ENUT | Enhanced Non pre-emptible Unprotected Traffic |
| NE | Network Element |
| STM | Synchronous Transport Module |
| STS | Synchronous Transport Signal |
| OC | Optical Carrier |
| SNCP | Sub-network Connection Protection |
| APS | Automatic Protection Switching |
| UPSR | Unidirectional Path-Switched Rings |
| VC | Virtual Container |
| VT | Virtual tributaries |
| AU | Administrative Unit |
| TU | Tributary Unit |
| TUG | Tributary Unit Group |

We claim:

1. A method to implement a 2-fiber shared protection ring with extra traffic on a STM-1/OC-3 interface, said method comprising:
utilizing a MSSPRing/BLSR method for a SDH/SONET traffic protection: configuring the STM-1 interface, comprising the shared protection ring in a AU4/AU 3 mapping; configuring the STM-1/OC-3 shared protection ring to operate at a predetermined granularity; and protecting the traffic of the STM-1/OC-3 shared protection ring at the predetermined granularity, wherein the STM-1/OC-3 shared protection ring is configured for the predetermined granularity to fix a plurality of work and protect channels, a switching unit, a connection function and a squelching procedure for a protection mechanism, wherein the predetermined granularities are selected from a group comprising at least one of VC12, VC11, VC3, VC12-VC3 and VC11-VC3 for at least one of AU-4 mapping and AU-3 mapping, wherein the VC 12 granularity includes 1 to 31 TU 12 as work channels, 32 to 62 TU 12 as protect channels and 63rd TU 12 as Enhanced Non pre-emptible Unprotected Traffic (ENUT).

2. The method as claimed in claim 1, wherein the VC 11 granularity has 1 to 42 TU 11 as work channels and 43 to 84 TU 11 as protect channels.

3. The method as claimed in claim 1, wherein the VC 12-VC 3 granularity has 1 to 21 TU 12 of first TUG3 as work channels, 22 to 42 TU 12 of second TUG 3 as protect channels and TU3 of third TUG 3 as ENUT channels.

4. The method as claimed in claim 1, wherein the VC11-VC 3 granularity has 1 to 28 TU 11 of first TUG 3 as work channels, 29 to 56 TU 11 of second TUG 3 as protect channels and TU3 of third TUG3 as ENUT channels.

5. The method as claimed in claim 1, wherein the VC11-VC 3 granularity has 1 to 28 TU11 of first TUG 3 as work channels, 29 to 56 TU11 of second TUG 3 as protect channels and TU3 of third TUG 3 as ENUT channels.

6. The method as claimed in claim 1, wherein a switching granularity for the VC 3 granularity is the higher order AU 3 channel.

7. The method as claimed in claim 1, wherein the VC 3 granularity has 1st AU3 as work channel, $2^{nd}$ AU3 as protect channel and $3^{rd}$ AU3 as ENUT channel.

8. The method as claimed in claim 1, wherein a switching connection function is implemented at a lower order VC layer for the 2-Fiber STM-1 shared protection ring for the group comprising:
AU 4 mapping and VC 12 granularity, AU4 mapping and VC 11 granularity, AU4 mapping and VC 3 granularity, AU 4 mapping and VC12-VC 3 granularity, AU4 mapping and VC11-VC3 granularity, AU3 mapping and VC 12 granularity and AU3 mapping and VC 11 granularity.

9. The method as claimed in claim 1, wherein a switching connection function is implemented at a higher order VC layer for the 2-Fiber STM-1 shared protection ring for AU3 mapping and VC 3 granularity.

10. The method as claimed in claim 1, wherein a work or protect channel which is based on the granularity configured for the 2-Fiber shared protection ring on STM-1 interface, can be configured as the Enhanced Non pre-emptible Unprotected Traffic (ENUT), wherein the ENUT is configured on the TUs based on the STM-1 interface mapping and granularity configured for forming 2-Fiber shared protection ring, selected from a group comprising at least one of:
AU4 mapping and VC12 granularity, AU4 mapping and VC11 granularity, AU4 mapping and VC 3 granularity, AU4 mapping and VC12-VC3 granularity, AU4 mapping and VC 11-VC3 granularity, AU3 mapping and VC 12 granularity and AU3 mapping and VC11 granularity.

11. The method as claimed in claim 10, wherein a squelching procedure to avoid misconnections in the system forming the 2-Fiber shared protection ring on STM-1 interface, is performed on the TUs for
AU4 mapping and VC12 granularity;
AU4 mapping and VC 11 granularity;
AU4 mapping and VC3 granularity;
AU4 mapping and VC12-VC3 granularity;
AU4 mapping and VC11-VC3 granularity;
AU3 mapping and VC12 granularity;
and AU3 mapping and VC 11 granularity.

12. The method as claimed in claim 10, wherein the predetermined granularities are selected from a group comprising at least one of VT2, VT1.5 and STS-1 for STS-1 mapping in an OC-3 interface, wherein the VT1.5 granularity has 1 to 42 VT1.5 s as work channels and 43 to 84 VT1.5s as protect channels.

13. The method as claimed in claim 12, wherein the VT1.5 granularity has 1 to 42 VT1.5 s as work channels and 43 to 84 VT1.5s as protect channels.

14. The method as claimed in claim 12, wherein a switching connection function is implemented at a lower order layer for the 2-Fiber OC-3 shared protection for the granularities VT2 and VT1.5.

15. The method as claimed in claim 12, wherein a switching connection function is implemented at a higher order layer for the 2-Fiber OC-3 shared protection for the STS-1 granularity.

16. The method as claimed in claim 12, wherein the STS-1 granularity has first STS-1 as work channel, second STS-1 as protect channel and third STS-1 as ENUT channel wherein the work channel which is based on the granularity configured for the 2-Fiber shared protection ring on the OC-3 interface is optionally configured as an Enhanced Non pre-emptible Unprotected Traffic (ENUT).

17. The method as claimed in claim 12, wherein the protect channel which is based on the granularity configured for the 2-Fiber shared protection ring on the OC-3 interface is optionally configured as an Enhanced Non pre-emptible Unprotected Traffic (ENUT).

18. The method as claimed in claim 12, wherein a squelching procedure to avoid misconnections in the system forming the 2-Fiber shared protection ring on OC-3 interfaces is performed on the lower order VTs for the VT2 and VT1.5 granularity.

* * * * *